(12) United States Patent
Kollberg et al.

(10) Patent No.: US 11,858,520 B2
(45) Date of Patent: Jan. 2, 2024

(54) METHOD FOR ESTIMATING WHEEL BASE LENGTH OF A TRAILER OF A VEHICLE COMBINATION COMPRISING MORE THAN ONE ARTICULATION ANGLE

(71) Applicant: VOLVO TRUCK CORPORATION, Gothenburg (SE)

(72) Inventors: Peter Kollberg, Floda (SE); Daniel Persson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 164 days.

(21) Appl. No.: 17/594,273

(22) PCT Filed: Apr. 9, 2019

(86) PCT No.: PCT/EP2019/058993
§ 371 (c)(1),
(2) Date: Oct. 8, 2021

(87) PCT Pub. No.: WO2020/207572
PCT Pub. Date: Oct. 15, 2020

(65) Prior Publication Data
US 2022/0169261 A1    Jun. 2, 2022

(51) Int. Cl.
*B60W 40/12* (2012.01)
*B60W 30/12* (2020.01)
(Continued)

(52) U.S. Cl.
CPC ............ *B60W 40/12* (2013.01); *B60W 30/12* (2013.01); *B60W 30/18036* (2013.01);
(Continued)

(58) Field of Classification Search
CPC ................ B60W 40/12; B60W 30/12; B60W 30/18036; B60W 30/18163;
(Continued)

(56) References Cited

U.S. PATENT DOCUMENTS

| 6,301,548 B1 * | 10/2001 | Gerum | B60T 8/1708 |
| | | | 702/158 |
| 2018/0319437 A1 | 11/2018 | Hu et al. | |
| 2019/0300005 A1 * | 10/2019 | Di | G01S 17/931 |

FOREIGN PATENT DOCUMENTS

| EP | 2914474 A1 | 9/2015 |
| SE | 517140 C2 | 4/2002 |

OTHER PUBLICATIONS

International Search Report and Written Opinion dated Jan. 22, 2020 in corresponding International PCT Application No. PCT/EP2019/058993, 10 pages.
(Continued)

*Primary Examiner* — Isaac G Smith
(74) *Attorney, Agent, or Firm* — Venable LLP; Jeffri A. Kaminski

(57) ABSTRACT

The present disclosure relates to a method for estimating a wheel base length (D) of at least one trailer (10) of a vehicle combination (100) comprising a towing vehicle (1), the at least one trailer and more than one articulation joint (A1, A2), wherein the towing vehicle comprises at least one wheel identification sensor (2) for identifying wheels (11, 12, 13) of the at least one trailer, the method comprising the following steps: —(S1) performing a plurality of wheel identification measurements on at least one side of the at least one trailer, by means of the at least one sensor during use of the vehicle combination, —(S2) determining a number of identifiable active wheels on the at least one side of the at least one trailer in each one of the plurality of wheel identification measurements, —(S3) determining a total number of active wheels on the at least one side of the at least one trailer, wherein the total number of active wheels is determined based on at least one of the plurality of wheel identification measurements in which a maximum number of identifiable active wheels was determined, —(S4) determin-
(Continued)

ing a position of each identifiable active wheel at least from the at least one of the plurality of wheel identification measurements in which the maximum number of active wheels was determined, and —(S5) estimating the wheel base length based on the determined position of each active wheel.

17 Claims, 3 Drawing Sheets

(51) Int. Cl.
  *B60W 30/18* (2012.01)
  *G01S 13/931* (2020.01)
  *G06V 20/56* (2022.01)
  *G01S 7/41* (2006.01)
(52) U.S. Cl.
  CPC . *B60W 30/18163* (2013.01); *B60W 2300/145* (2013.01); *B60W 2530/201* (2020.02); *G01S 7/415* (2013.01); *G01S 2013/9315* (2020.01); *G01S 2013/9323* (2020.01); *G01S 2013/9324* (2020.01); *G06V 20/56* (2022.01)
(58) Field of Classification Search
  CPC ....... B60W 2300/145; B60W 2530/201; G01S 7/415; G01S 2013/9315; G01S 2013/9323; G01S 2013/9324
  USPC .......................................................... 701/23
  See application file for complete search history.

(56) References Cited

OTHER PUBLICATIONS

International Preliminary Report on Patentability dated Mar. 3, 2021 in corresponding International PCT Application No. PCT/EP2019/058993, 9 pages.

* cited by examiner

METHOD FOR ESTIMATING WHEEL BASE LENGTH OF A TRAILER OF A VEHICLE COMBINATION COMPRISING MORE THAN ONE ARTICULATION ANGLE

CROSS-REFERENCE TO RELATED APPLICATIONS

This application is a U.S. National Stage application of PCT/EP2019/058993, filed Apr. 9, 2019, and published on Oct. 15, 2020, as WO 2020/207572 A1, all of which is hereby incorporated by reference in its entirety.

TECHNICAL FIELD

The invention relates to a method for estimating a wheel base length of at least one trailer of a vehicle combination comprising a towing vehicle, the at least one trailer and more than one articulation joint. The invention furthermore relates to a control unit for a towing vehicle, a towing vehicle, a computer program and/or to a computer readable medium carrying a computer program.

The invention can be applied in heavy-duty vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

In recent years there has been an increased focus on developing more advanced driving assistance systems for vehicles. This includes reverse assistance systems, lane keeping assistance systems, lane changing assistance systems, turning assistance systems etc. Hence, a vehicle may comprise assistance systems which are used to assist a driver of the vehicle in different situations. Moreover, these types of systems may not only be used for assisting a driver, but may also be advantageously implemented in fully or semi-autonomous vehicles. The systems may thus also be adapted to perform all controlling operations during a driving situation for at least a limited period of time.

A vehicle combination comprising a towing vehicle and one or more connected trailers may benefit from using these types of systems since the vehicle combination is likely more difficult to handle in certain situations, such as during reversing. This is especially the case when the vehicle combination comprises more than one articulation joint, i.e. the vehicle combination has more than one articulation angle.

An example of a vehicle combination comprising more than one articulation joint is the so called "Nordic combination". The Nordic combination comprises a towing truck which is adapted to carry a load in a container, tipper body or the like. The towing truck is connected to a semitrailer via a dolly unit. The dolly unit is pivotably connected to the towing truck and also pivotably connected to the semitrailer, thereby providing two articulation joints for the vehicle combination. Another example of a vehicle combination having more than one articulation joint is a so called "A-double combination", which is characterized by a tractor vehicle (towing vehicle) connected directly to a semitrailer, which in turn is connected to a following trailer via a pivotable dolly unit.

Estimation of wheel base length of trailers may be important for the above mentioned systems, since the wheel base length may be required as input to be able to estimate the driving path of the vehicle combination, such as during a reversing operation.

The US patent application no. US2018319437 A1 discloses a steering assist system for a vehicle including length estimation for a trailer by using an image including a trailer wheel. A camera provided on the vehicle is used for generating an image of the trailer, and the vehicle further comprises a controller. The controller receives the image and identifies a wheel therein, determines a trailer hitch angle using at least one of an aspect ratio or location of the wheel in the image, and implements a trailer backup mode including using the estimated hitch angle in view of a kinematic model of the vehicle and trailer combination to control the steering system in reversing the trailer along a user-selected path. A drawback of the disclosure is that it is not suitable for estimating the length of a trailer for vehicle combinations having more than one articulation joint. Therefore, it has been realized that there is a need for providing trailer wheel base estimation also for vehicle combinations having more than one articulation joint.

Further, towing vehicles are often switching between different trailers. This is especially common for commercial vehicles, where e.g. a truck may frequently switch between more than one trailer having different sizes and wheel base lengths. Information about each trailer's wheel base length is also generally not known. Furthermore, some wheels of the trailers may also occasionally be unused, which also affects the wheel base length.

SUMMARY

In view of the above, an object of the invention is to provide an improved method for estimating a wheel base length of a trailer of a vehicle combination having more than one articulation joint. More particularly, an object of the invention is to provide an improved method which estimates a trailer wheel base length with high precision in an efficient manner for a vehicle combination having more than one articulation joint. Furthermore, an object of the invention is to provide an improved control unit for a towing vehicle, an improved towing vehicle, an improved computer program and/or an improved computer readable medium carrying a computer program.

According to a first aspect, the object is achieved by a method according to claim 1. According to a second aspect, the object is achieved by a control unit for a towing vehicle according to claim 13. According to a third aspect, the object is achieved by a towing vehicle according to claim 14. According to a fourth aspect, the object is achieved by a computer program according to claim 17. According to a fifth aspect, the object is achieved by a computer readable medium carrying a computer program according to claim 18.

According to the first aspect thereof, the object is achieved by a method for estimating a wheel base length of at least one trailer of a vehicle combination comprising a towing vehicle, the at least one trailer and more than one articulation joint, wherein the towing vehicle comprises at least one wheel identification sensor for identifying wheels of the at least one trailer, the method comprising the following steps:

performing a plurality of wheel identification measurements on at least one side of the at least one trailer, by means of the at least one sensor during use of the vehicle combination, determining a number of identifiable active wheels on the at least one side of the at least one trailer in each one of the plurality of wheel identification measurements, determining a total number of active wheels on the at least one side of the at least one trailer, wherein the total number of active wheels is determined based on at least one of the plurality of wheel identification measurements in which a maximum number of identifiable active wheels was determined, determining a position of each identifiable active wheel at least from the at least one of the plurality of wheel identification measurements in which the maximum number of active wheels was determined, and estimating the wheel base length based on the determined position of each active wheel.

By the provision of the method as disclosed herein, an improved method for estimating a trailer wheel base length for a multi articulation joint vehicle combination is provided. By the realization of the inventors that trailer wheels may be occluded for the at least one wheel identification sensor at limited periods during driving, it has been realized that improved precision in the estimation may be provided by considering the measurements by the sensor in which the total number of active wheels are identifiable. The method is based on the assumption that the maximum number of identified active wheels corresponds to the total number of active wheels of the at least one trailer. Further, the method may also provide the wheel base estimation in shorter time since one or more of the more unreliable measurements where fewer active wheels are identified may be disregarded. Thereby fewer measurements may be used for the estimation until reaching a reliable result. Still further, the method may also result in less complicated calculation algorithms for the wheel base estimation, since it may disregard the measurements where not the total number of active wheels are identified, or at least it may disregard one or more of these measurements where fewer than the total number of wheels are identified. It may namely be more difficult to estimate wheel base length from measurements where not all active wheels have been identified.

The expression "active wheel(s)" as used herein may be defined as a wheel or wheels which is/are rotating and in contact with the road on which the vehicle combination is running. Just as a matter of example, wheels on a trailer may be inactivated when the trailer is not loaded. Inactivation of wheels may for example be performed by raising the wheels such that they do not contact the road.

Optionally, the position of each active wheel may be determined from a plurality of wheel identification measurements in which the maximum number of active wheels was determined, and wherein the estimated wheel base length is an average value which is at least based on said measurements. Hence, by considering more than one such measurement for the estimation, the estimation may be further improved. An average value may be provided by use of different approaches, such as by use of statistical methods calculating for example a mode value, a median value and/or a mid-range value. The average value may be an average value of the estimated wheel base lengths from each one of the plurality of wheel identification measurements in which the maximum number of active wheels was determined. Alternatively, the average value may be based on average values for the determined positions of each active wheel, and therefrom a wheel base length may be estimated.

Optionally, the position of each active wheel may be determined with respect to a reference point, preferably a reference point provided on the towing vehicle.

Optionally, the position of each active wheel may be determined by identifying a Doppler profile of each active wheel. It has namely been realized that identifying a Doppler profile of a wheel may facilitate providing of reliable position estimation of an active wheel. In fact, a wheel's Doppler profile is only identifiable when a wheel is rotating. By identifying the Doppler profile from the wheel, improved precision in the estimated position may also be provided. Still optionally, the identified Doppler profile may comprise a velocity v at an outer peripheral end of the active wheel and a velocity −v at a diametrically opposite outer end of the active wheel, wherein the velocity varies linearly between the two outer ends. Still optionally, the determined position of each active wheel may preferably be the position where the velocity is zero between the two outer ends. This position may also be referred to as a center position of the wheel. By considering a linear velocity curve of the wheel, the precision of the position estimation may be improved. Preferably, the outer peripheral end positions are located at a top position of the wheel and on a bottom position of the wheel.

Optionally, the wheel base length may be an effective wheel base length of the at least one trailer. An effective wheel base length may be defined as the length between the positions where the trailer is pivoting during turning of the vehicle combination. For example, a trailer having a multi-axle rear end, such as two or three wheel axles positioned proximate each other at the rear end, will have an effective wheel axle position located somewhere therebetween. By identifying the position of each active wheel of each respective wheel axle of the proximate wheel axles, the effective wheel axle position may be calculated/estimated. How to calculate the effective wheel axle position is well known by the skilled person and will therefore not be described more in detail herein. However, just as a matter of example, an estimated wheel axle position, in the case when there are two proximate wheel axles at a trailer rear end, may be the position located midway between the two identified wheel positions of the two wheel axles.

Optionally, the effective wheel base length may be provided by the step of grouping wheels into at least one wheel group having an effective common wheel axle, wherein the grouping of wheels is based on the determined positions of each wheel. For example, a trailer may have an effective common wheel axle at a rear position of the trailer and/or an effective common wheel at a front position of the trailer. Grouping of wheels may for example be performed by comparing distances between the identified active wheels, and therefrom group the wheels which are located within a certain distance, and/or grouping wheels by identifying a distance which is indicative of a distance between a front and rear wheel axle group of the trailer.

Optionally, the method may further comprise the step of identifying which wheel and/or which wheel group is associated to which trailer of the vehicle combination. This may for example be performed by comparing distances between the different identified active wheels, and therefrom group the wheels into different groups and associate the wheels to different trailers and/or to (a) dolly unit(s). In this context, it shall be noticed that a dolly unit may be regarded as a separate trailer unit of the vehicle combination. However, a dolly unit may be permanently connected to e.g. a trailer, whereby an effective wheel base length of such a trailer may be defined as the length between the effective wheel axle position of the dolly unit and the effective wheel axle position of the group of wheels located proximate the rear end of the trailer.

Optionally, the determination of the total number of active wheels may be performed during forward driving of the vehicle combination.

Optionally, the method may further comprise the step of identifying when the at least one trailer is being or has been connected and/or released to/from the towing vehicle. Thereby, the method may be further improved by knowing when the measurements preferably should be initiated and/or reinitiated. In fact, the wheel base estimation may not only be performed continuously, but could also advantageously be performed for a limited period of time after which a trailer has been connected to the towing vehicle. Thereby, the method may not take up unnecessary processing capacity during use of the vehicle combination.

Optionally, the method may further comprise the step of providing the estimated wheel base length of the at least one trailer as input to at least one of a reverse assist system, a turning assist system during forward driving, a lane changing assist system and a lane keeping assist system of the towing vehicle. By providing the estimated wheel base length to these assist systems, the precision of the reverse assist system and/or the other systems may be improved since they will receive a high precision estimation of the wheel base length of the at least one trailer.

Optionally, the method may further comprise the step of determining a current articulation angle of at least one of the articulation joints of the vehicle combination. Just as a matter of example, the determination of an articulation angle may be provided by the at least one sensor, or alternatively by one or more auxiliary sensors provided on the vehicle combination. Knowing the articulation angles may further improve the wheel base estimation. For example, the current determined positions of the active wheels may be dependent on the current relative angular position between the towing vehicle and trailer(s) of the vehicle combination. Hence, by also knowing the current articulation angles, the wheel base estimation may be further improved.

According to the second aspect thereof, the object is achieved by a control unit for a towing vehicle, configured to perform the steps of the method according to any one of the embodiments of the first aspect of the invention. Advantages of the second aspect of the invention are analogous to the advantages of the first aspect of the invention. It shall also be noted that all embodiments of the first aspect of the invention are applicable to all embodiments of the second aspect of the invention and vice versa.

According to the third aspect thereof, the object is achieved by a towing vehicle for a vehicle combination comprising at least one trailer and more than one articulation joint, the towing vehicle comprising:

at least one wheel identification sensor for identifying wheels of the at least one trailer, and
a control unit according to any one of the embodiments of the second aspect of the invention.

Advantages of the third aspect of the invention are analogous to the advantages of the first and second aspects of the invention. It shall also be noted that all embodiments of the first and second aspects of the invention are applicable to all embodiments of the third aspect of the invention and vice versa.

Optionally, the at least one sensor may be any one of a camera sensor, a LIDAR (Light Detection And Ranging) sensor, a RADAR (Radio Detection And Ranging) sensor or a SONAR (sound navigation and ranging) sensor. Still optionally, the at least one sensor may be a side sensor provided on the left or right side of the towing vehicle.

Optionally, the towing vehicle may be any one of a truck, such as a heavy duty truck and/or a tractor truck, a bus, a construction equipment vehicle.

According to the fourth aspect thereof, the object is achieved by a computer program comprising program code means for performing the steps of any of the embodiments of the first aspect of the invention, when said program is run on a computer.

According to the fifth aspect thereof, the object is achieved by a computer readable medium carrying a computer program comprising program code means for performing the steps of any of the embodiments of the first aspect of the invention, when said program product is run on a computer.

BRIEF DESCRIPTION OF THE DRAWINGS

With reference to the appended drawings, below follows a more detailed description of embodiments of the invention cited as examples.

In the drawings.

Figure 1:
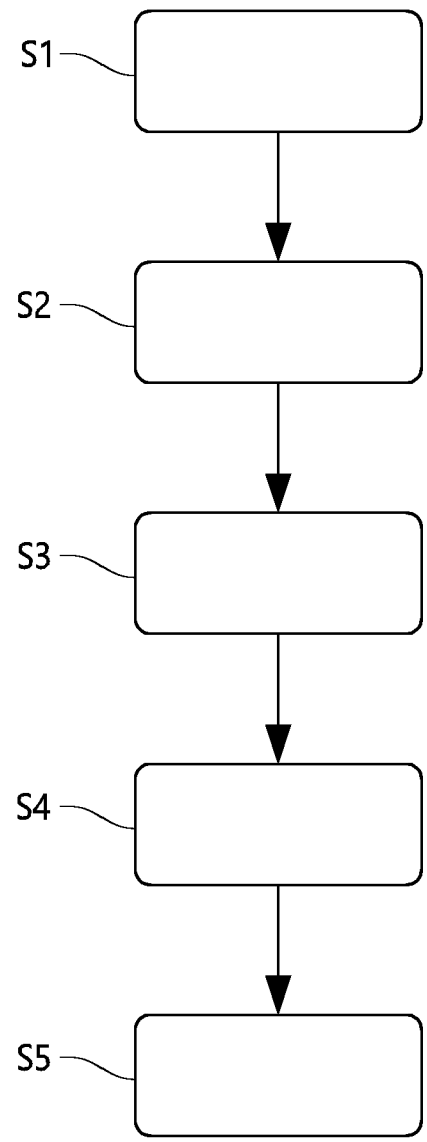
FIG. 1 shows a flow chart of a method according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 2:
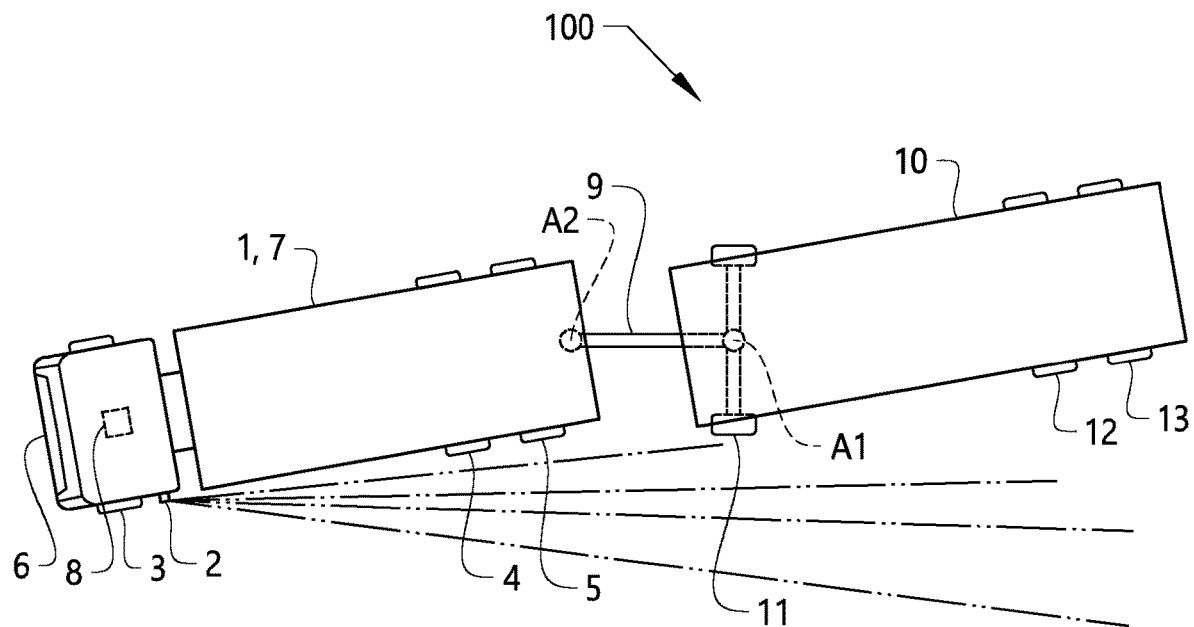
FIG. 2 shows a vehicle combination from above of an example embodiment of the present invention.
Figure 3:
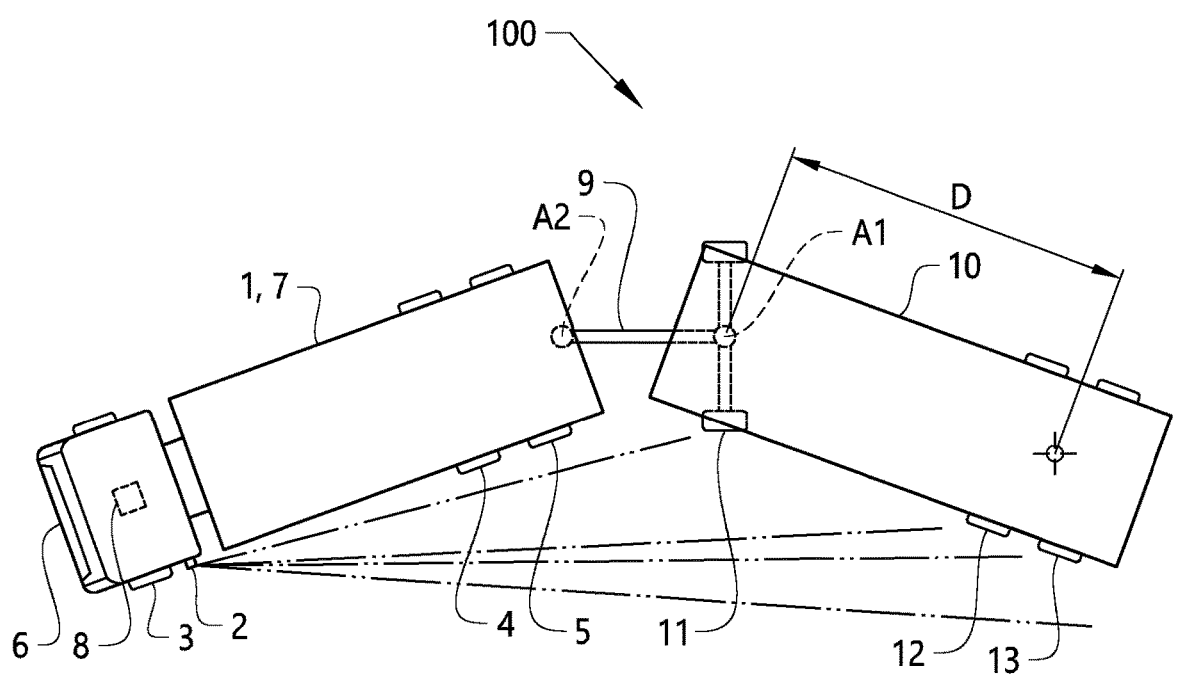
FIG. 3 shows the vehicle combination in FIG. 2, wherein the vehicle combination is positioned differently.

FIG. 1 shows a flowchart of an example embodiment of the method of the present invention and FIGS. 2 and 3 show a vehicle combination 100 from above where the connected trailer 10 is positioned in two different positions. The vehicle combination 100 is in this example a so called Nordic combination comprising a towing vehicle 1, a trailer 10 and a dolly unit 9 connecting the trailer 10 and the towing vehicle 1. The vehicle combination comprises two articulation joints, A1 and A2. The towing vehicle 1, which here is a heavy-duty truck, comprises a cab 6 and a load space 7. On one of the sides is a sensor 2 positioned for identifying wheels of the trailer 10 and the dolly unit 9. The side sensor 2 is here a RADAR sensor. This sensor may also advantageously be used for other tasks, such as for blind spot detection. As already mentioned in the above, the dolly unit 9 may be regarded as a separate trailer or as an integrated part of the trailer 10. The towing vehicle comprises front wheels 3 and rear wheels, 4 and 5, and the trailer 10 comprises two rear wheels 12, 13 one its left-hand side, as seen in the vehicle combination's forward driving direction. Further, the dolly unit 9 comprises one wheel 11 on its left-hand side.

The flow chart in FIG. 1 shows a method for estimating a wheel base length D of at least one trailer 10 of a vehicle combination 100 comprising a towing vehicle 1, such as the vehicle combination 100 shown in FIGS. 2 and 3. The method comprises the following steps:
- a step S1 of performing a plurality of wheel identification measurements on at least one side of the at least one trailer 10, by means of the at least one sensor 2 during use of the vehicle combination 100,
- a step S2 of determining a number of identifiable active wheels on the at least one side of the at least one trailer 10 in each one of the plurality of wheel identification measurements,
- a step S3 of determining a total number of active wheels on the at least one side of the at least one trailer 10, wherein the total number of active wheels is determined based on at least one of the plurality of wheel identification measurements in which a maximum number of identifiable active wheels was determined,
- a step S4 of determining a position of each identifiable active wheel at least from the at least one of the plurality of wheel identification measurements in which the maximum number of active wheels was determined, and
- a step S5 of estimating the wheel base length D based on the determined position of each active wheel.

With reference to especially FIGS. 2 and 3, the towing vehicle 1 further comprises a control unit 8 which is connected to the sensor 2. The control unit 8 may be any kind of control unit of the towing vehicle 1, such as for example an ECU (Electronic Control Unit) which also may be configured for performing other control functions. The control unit 8 may comprise a processing unit and a memory unit which carries a computer program which comprises program code means for performing the steps of any of the embodiments of the first aspect of the invention. The sensor 2 may be connected to the control unit by an electrical wire and/or by a wireless connection. The communication between the sensor 2 and the control unit may for example be performed by a CAN bus system, Bluetooth, WiFi or by any other known communication system.

The vehicle combination 100 in FIG. 2 is positioned such that the sensor 2 is able to identify one active wheel 11 during forward driving, whilst the wheels 12 and 13 of the trailer 10 are occluded for the sensor 2. Thereby, if the sensor 2 performs a wheel identification measurement on the left-hand side of the trailer 10 at this occasion, it will be able to identify the wheel 11 only. This specific position of the vehicle combination 100 may be called a "z-configuration", where the letter "z" refers to the relative orientation of the different parts (towing vehicle, dolly unit and trailer) of the vehicle combination 100 relative each other. The performed wheel identification measurement may be regarded as one separate frame or sample which is based on the information generated from the sensor 2. This frame or sample will thus provide information that there is one wheel on the side of the trailer. When the vehicle combination 100 continues to move forward, it may eventually end up in the position as shown in FIG. 3. In this position, all wheels, 11, 12 and 13 on the left-hand side of the trailer 10 and the dolly unit 9 can be identified by the sensor 2. The sensor 2 may then perform a second wheel identification measurement at this occasion, thereby providing a second frame or sample, in which three active wheels, 11, 12 and 13, are identified. From the above two measurements, i.e. the two measurements, which also may be referred to as step S1 and S2 in FIG. 1, a total number of active wheels on the at least one side of the at least one trailer can be determined. This is done in that the total number of active wheels is determined based on the wheel identification measurement in which three identifiable active wheels was identified, i.e. a maximum number from the two measurements. This step may be referred to as step S3 in FIG. 1. From the frame or sample where the three wheels were identified, a position of each active wheel, 11, 12 and 13, can be determined. The position may for example be provided by identifying each wheel's Doppler profile, as will be further described with reference to FIG. 4. This part of the method may be referred to as step S4 in FIG. 1. Further, each position is preferably determined with respect to a reference point, preferably a reference point on the towing vehicle 1. The position of each wheel may for example be defined in a coordinate system, such as a Cartesian coordinate system, for example in a two or three-dimensional space by an x-y plane or x-y-z space. Based on the determined position of each active wheel, 11, 12 and 13, the trailer's wheel base length D may be estimated. This part of the method may be referred to as step S5 in FIG. 1. The estimated wheel base D is here the effective wheel base of the trailer 10. As can be seen, the effective wheel base length D extends from the articulation joint A1 to the position located midway between the wheels 12 and 13.

To further improve the wheel base estimation, at least one sensor may be provided for detecting an angle of at least one of the articulation joints of the vehicle combination. In a preferred embodiment, all articulation angles at the joints A1 and A2 are known by information provided from one or more sensors. The one or more sensors may for example be additional sensors provided at the rear end of the towing vehicle, such as an ultrasound sensor or the like. Further, there may be sensor(s) provided at the articulation joints which are adapted to measure the current articulation angle. Still optionally, a dynamic vehicle model may be used to further improve the wheel base estimation. Just as a matter of example, at least one of a dynamic vehicle model, measured articulation angles, yaw rate, GNSS (Global Navigation Satellite System) position and heading and wheel position, and the wheel base length estimation, as estimated herein, can be combined in a standard Kalman filter-type calculation to provide a further improved wheel base estimate. Kalman filters are well-known for the skilled person, and are for example explained in the book "Beyond the Kalman filter, particle filters for tracking applications", [Branco Ristic, Sanjeev Arulampalam, and Neil Gordon, Artech House, Boston, London 2004]. Furthermore, the estimation may be further improved by also knowing the position of each coupling point, in this embodiment the articulation joints A1 and A2. For example, in a Nordic combination vehicle with no communication connection between truck and dolly, the second coupling point is often well approximated as positioned close to the centre of the dolly wheel axles. For an A double combination with only the first and the second trailers connected to the truck via a communication link, the coupling points may be communicated and known at the truck.

Figure 4:
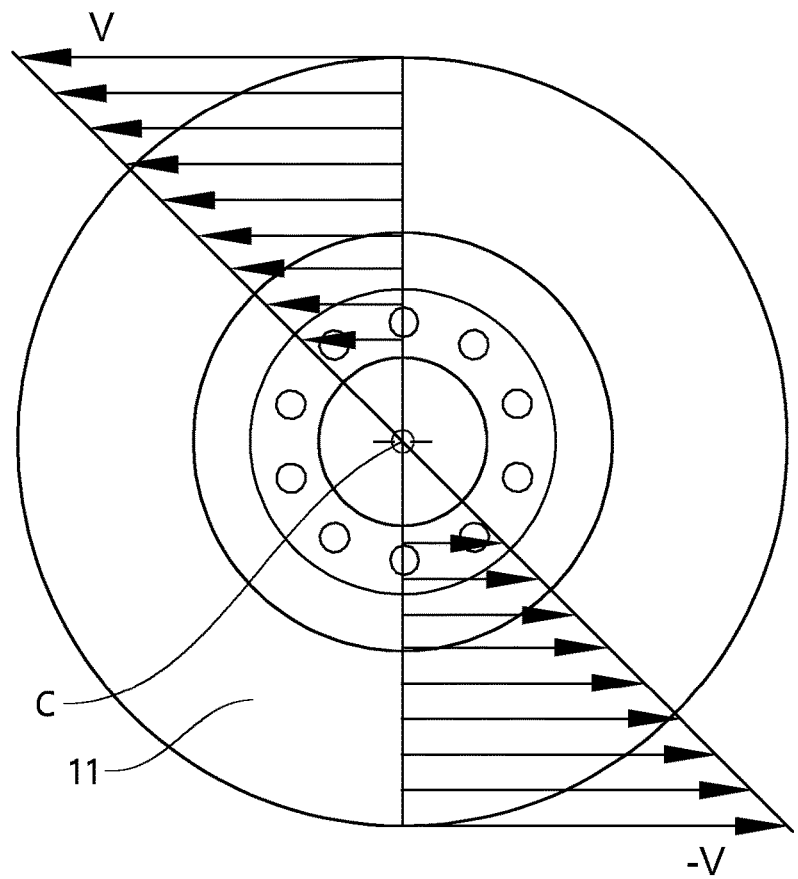
FIG. 4 shows a schematic view of a wheel of a trailer according to an example embodiment of the present invention.

FIG. 4 shows a side view of one active wheel, here exemplified with the wheel 11 from FIGS. 2 and 3. The wheel 11 is active, i.e. it is rotating around a wheel axle (not shown) about a center point C. A wheel identification sensor, preferably a RADAR or LIDAR sensor, is able to detect the wheel's velocity profile, which may be defined as a Doppler profile which identifies a velocity v at an outer peripheral end of the active wheel and a velocity −v at a diametrically opposite outer end of the active wheel. The velocity varies linearly between the two outer ends. The two outer ends are in this embodiment located substantially at the top and bottom position of the wheel 11. By the Doppler profile, the position of the wheel 11, which is defined as the wheel's center point C may be determined in a reliable manner. The position C is the point in the Doppler profile where the velocity is zero. Hence, each active wheel may be identified by the sensor in that the wheels are rotating. Furthermore, wheels which are not in use, and which also are not in contact with ground, may not be identified. These wheels are preferably not identified since they will not affect the trailer's effective wheel base. Once such a wheel is activated, i.e. in contact with ground, it may be identified by its Doppler profile. Therefore, in view of the above, the invention provides an efficient and flexible method for identifying an effective wheel base length for the trailer, which may change over time.

Figure 5:
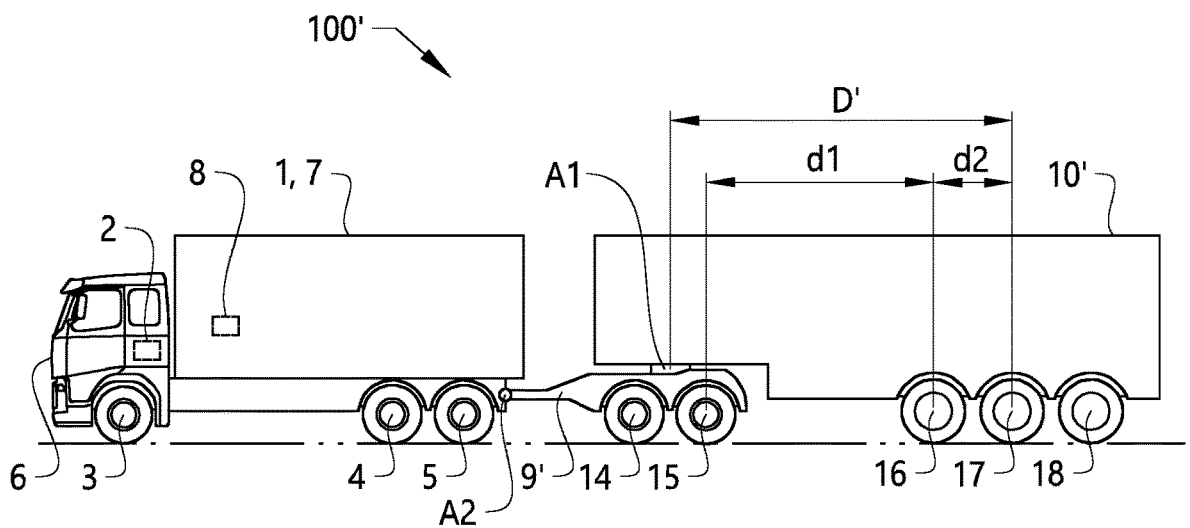
FIG. 5 shows a view from the side of a vehicle combination according to an example embodiment of the present invention.

FIG. 5 shows a side view of a vehicle combination 100' comprising a towing truck 1 and a trailer 10' connected thereto via a dolly unit 9'. The towing truck 1 is similar to the truck as shown in FIGS. 2 and 3, i.e. it comprises three wheels 3, 4 and 5 on its left-hand side, a sensor 2 positioned on the same side, a control unit 8 and an articulation joint (coupling point) A2. It also has a cab 6 for the driver and a load space 7. The method for identifying the wheel base length D' of the trailer 10' may be performed in a similar manner as explained in the above. The dolly unit 9' in this embodiment has two wheels 14 and 15 on its left-hand side, with respect to the forward driving direction of the vehicle combination 100'. Further, an articulation joint A1 is placed substantially midway between the two wheels, as seen from the side of the vehicle combination 1. Hence, the location of the articulation joint A1 may be determined by knowing the position of the two wheels 14 and and estimating that the articulation point is located therebetween, such as midway between the wheels.

The wheels 14, 15, 16, 17 and 18 may also be grouped into different wheel groups. In this example the wheel groups are preferably a first wheel group of the dolly 9', including the wheels 14 and 15, and a second wheel group of the trailer 10', including the wheels 16, 17 and 18. The grouping may be performed by determining the relative distance between the different wheels. This is preferably done by use of the determined positions from each wheel, which has been determined by use of the sensor 2. For example, from the determined positions, a distance d1 between the wheels 15 and 16 and a distance d2 between the wheels 16 and 17 may be determined. Therefrom, it may be concluded that the wheels 16 and 17 belong to one wheel group and the wheel 15 to another wheel group, since the distance d1 is substantially larger than the distance d2. This procedure may be performed for all the wheels, where relative distances between the different wheels are determined based on the determined wheel positions. Furthermore, it may also be determined which wheel belongs to which trailer (or dolly). For example, this may be determined by using one or more of the plurality of measurements made by the sensor 2 and by determining if the wheel positions can be located along one or several imaginary axles. For example, it may be determined from the determined wheel positions, from one or several measurements, that the wheels 14 and 15 can be placed along a first imaginary axle and the wheels 16, 17 and 18 can be placed along a second imaginary axle, which is pivoting and/or angled with respect to the first axle. This may be an indication of that the wheels 14 and 15 are part of one unit, the dolly 9', and the wheels 16, 17 and 18 of another unit, the trailer 10'. This is preferably determined by using the wheel positions from more than one of the measurements where the maximum number of wheels was determined.

The embodiments as shown in FIGS. 2, 3 and 5 show one sensor 2 on the left-hand side of the towing vehicle 1. It shall however be understood that the towing vehicle 1 preferably comprises two such sensors located on each side thereof, and that the method preferably makes use of measurements from both these sensors, which may further improve the reliability of the measurement and also the time for obtaining a reliable estimation.

It is to be understood that the present invention is not limited to the embodiments described above and illustrated in the drawings; rather, the skilled person will recognize that many changes and modifications may be made within the scope of the appended claims.

The invention claimed is:

1. A method for estimating a wheel base length of at least one trailer of a vehicle combination comprising a towing vehicle, the at least one trailer and more than one articulation joint, wherein the towing vehicle comprises at least one wheel identification sensor for identifying wheels of the at least one trailer, the method comprising the following steps:

performing a plurality of wheel identification measurements on at least one side of the at least one trailer, by means of the at least one sensor during use of the vehicle combination, determining a number of identifiable active wheels on the at least one side of the at least one trailer in each one of the plurality of wheel identification measurements, determining a total number of active wheels on the at least one side of the at least one trailer, wherein the total number of active wheels is determined based on at least one of the plurality of wheel identification measurements in which a maximum number of identifiable active wheels was determined, determining a position of each identifiable active wheel at least from the at least one of the plurality of wheel identification measurements in which the maximum number of active wheels was determined, and estimating the wheel base length based on the determined position of each active wheel.

2. The method according to claim 1, wherein the position of each active wheel is determined from a plurality of wheel identification measurements in which the maximum number of active wheels was determined, and wherein the estimated wheel base length is an average value which is at least based on said measurements.

3. The method according to claim 1, wherein the position of each active wheel is determined with respect to a reference point, preferably a reference point provided on the towing vehicle.

4. The method according to claim 1, wherein the position of each active wheel is determined by identifying a Doppler profile of each active wheel.

5. The method according to claim 4, wherein the identified Doppler profile comprises a velocity v at an outer peripheral end of the active wheel and a velocity −v at a diametrically opposite outer end of the active wheel, wherein the velocity varies linearly between the two outer ends.

6. The method according to claim 5, wherein the determined position of each active wheel is the position where the velocity is zero between the two outer ends.

7. The method according to claim 1, wherein the wheel base length is an effective wheel base length of the at least one trailer.

8. The method according to claim 7, wherein the effective wheel base length is provided by the step of grouping wheels into at least one wheel group having an effective common wheel axle, wherein the grouping of wheels is based on the determined positions of each wheel.

9. The method according to claim 1, further comprising the step of identifying which wheel and/or which wheel group is associated to which trailer of the vehicle combination.

10. The method according to claim 1, wherein the determination of the total number of active wheels is performed during forward driving of the vehicle combination.

11. The method according to claim 1, further comprising the step of identifying when the at least one trailer is being or has been connected and/or released to/from the towing vehicle.

12. The method according to claim 1, further comprising the step of providing the estimated wheel base length of the at least one trailer as input to at least one of a reverse assist system, a turning assist system during forward driving, a lane changing assist system and a lane keeping assist system of the towing vehicle.

13. A control unit for a towing vehicle, for estimating a wheel base length of at least one trailer of a vehicle combination comprising the towing vehicle, at least one trailer and more than one articulation joint, configured to:
perform a plurality of wheel identification measurements on at least one side of at least one trailer, by means of at least one sensor during use of the vehicle combination,
determine a number of identifiable active wheels on the at least one side of the at least one trailer in each one of the plurality of wheel identification measurements,
determine a total number of active wheels on the at least one side of the at least one trailer, wherein the total number of active wheels is determined based on at least one of the plurality of wheel identification measurements in which a maximum number of identifiable active wheels was determined,
determine a position of each identifiable active wheel at least from the at least one of the plurality of wheel identification measurements in which the maximum number of active wheels was determined, and
estimate the wheel base length based on the determined position of each active wheel.

14. A towing vehicle for a vehicle combination comprising at least one trailer and more than one articulation joint, comprising:
at least one wheel identification sensor for identifying wheels of the at least one trailer, and
a control unit configured to,
perform a plurality of wheel identification measurements on at least one side of the at least one trailer, by means of the at least one sensor during use of the vehicle combination, determine a number of identifiable active wheels on the at least one side of at least one trailer in each one of the plurality of wheel identification measurements,
determine a total number of active wheels on the at least one side of the at least one trailer, wherein the total number of active wheels is determined based on at least one of the plurality of wheel identification measurements in which a maximum number of identifiable active wheels was determined,
determine a position of each identifiable active wheel at least from the at least one of the plurality of wheel identification measurements in which the maximum number of active wheels was determined, and
estimate a wheel base length based on the determined position of each active wheel.

15. The towing vehicle according to claim 14, wherein the at least one sensor is any one of a camera sensor, a LIDAR sensor, a RADAR sensor or a SONAR sensor.

16. The towing vehicle according to claim 14, wherein the at least one sensor is a side sensor provided on a left or right side of the towing vehicle.

17. A non-transitory computer readable medium carrying a computer program comprising program code for performing the following, when said program code is run on a computer,:
perform a plurality of wheel identification measurements on at least one side of at least one trailer, by means of at least one sensor during use of the vehicle combination,
determine a number of identifiable active wheels on the at least one side of the at least one trailer in each one of the plurality of wheel identification measurements,
determine a total number of active wheels on the at least one side of the at least one trailer, wherein the total number of active wheels is determined based on at least one of the plurality of wheel identification measurements in which a maximum number of identifiable active wheels was determined,
determine a position of each identifiable active wheel at least from the at least one of the plurality of wheel identification measurements in which the maximum number of active wheels was determined, and
estimate a wheel base length based on the determined position of each active wheel.

* * * * *